(12) United States Patent
Everidge et al.

(10) Patent No.: US 6,400,675 B1
(45) Date of Patent: Jun. 4, 2002

(54) COMPACT DISC WITH A DISC TRAY ALIGNMENT MEANS

(76) Inventors: Benjamin James Everidge, 901 E. Washington, Orlando, FL (US) 32801; Raymond K. Engelking, 3303 Joanne Dr., Orlando, FL (US) 32806; Gerald A. Pierson, 7361 Bordwine Dr., Orlando, FL (US) 32818

( * ) Notice: Subject to any disclaimer, the term of this patent is extended or adjusted under 35 U.S.C. 154(b) by 0 days.

(21) Appl. No.: 08/990,517

(22) Filed: Dec. 12, 1997

Related U.S. Application Data

(63) Continuation-in-part of application No. 08/856,915, filed on May 15, 1997, now Pat. No. 5,982,736.

(51) Int. Cl.⁷ .................................................. G11B 7/24
(52) U.S. Cl. ...................................................... 369/273
(58) Field of Search ................................. 369/272, 273, 369/282, 289, 290, 292; 360/2

(56) References Cited

U.S. PATENT DOCUMENTS

| | | | | |
|---|---|---|---|---|
| 3,201,133 A | * | 8/1965 | Matsukata | 369/289 |
| 4,166,622 A | * | 9/1979 | Rager | 369/270 |
| 4,634,617 A | * | 1/1987 | Ohta et al. | 428/65.2 |
| 4,812,633 A | * | 3/1989 | Vogelgesang et al. | 235/487 |
| 4,899,330 A | * | 2/1990 | Einhaus | 369/289 |
| 4,916,687 A | * | 4/1990 | Endo | 369/111 |
| 4,928,271 A | * | 5/1990 | Verhagen | 369/292 |
| 5,003,530 A | * | 3/1991 | Yamamori | 369/289 |
| 5,105,414 A | * | 4/1992 | Funabashi et al. | 369/75.2 |
| 5,579,296 A | * | 11/1996 | Smith et al. | 369/273 |
| 5,982,736 A | * | 11/1999 | Pierson | 369/273 |
| 6,016,298 A | | 1/2000 | Fischer | |
| 6,078,557 A | * | 6/2000 | Pierson | 369/273 |
| D435,853 S | * | 1/2001 | Mehta et al. | D14/478 |

FOREIGN PATENT DOCUMENTS

JP        4-40586      * 2/1992

* cited by examiner

*Primary Examiner*—Brian E. Miller
(74) *Attorney, Agent, or Firm*—Robert L. Wolter, Es; Beusse Brownlee Bowdoin & Wolter, PA

(57) ABSTRACT

A compact disc has an image embossed thereon and has a rectangular planar body. The compact disc stores information relating to the image and is used as a trading card. The compact disc is smaller than standard compact discs; therefore the compact disc has two ridges on the bottom surface for alignment of the compact disc with an inner circular rim of a disc tray. A docking collar is mounted to the bottom surface of the compact disc between a spindle hole and the ridges.

10 Claims, 3 Drawing Sheets

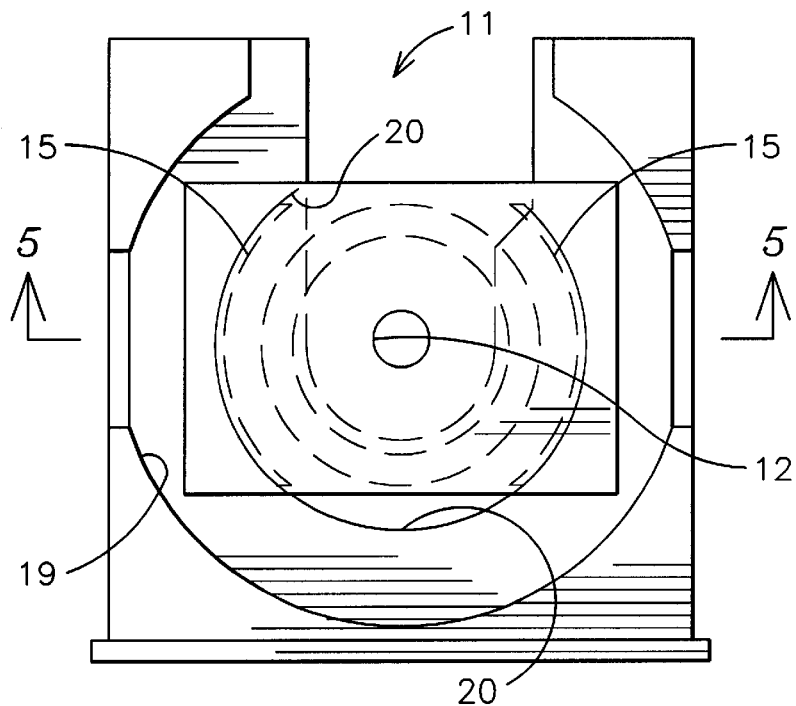
FIG. 4
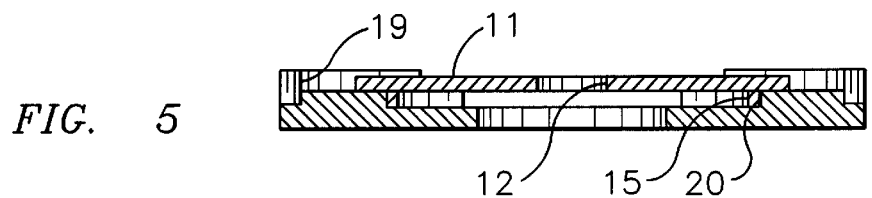
FIG. 5
FIG. 6
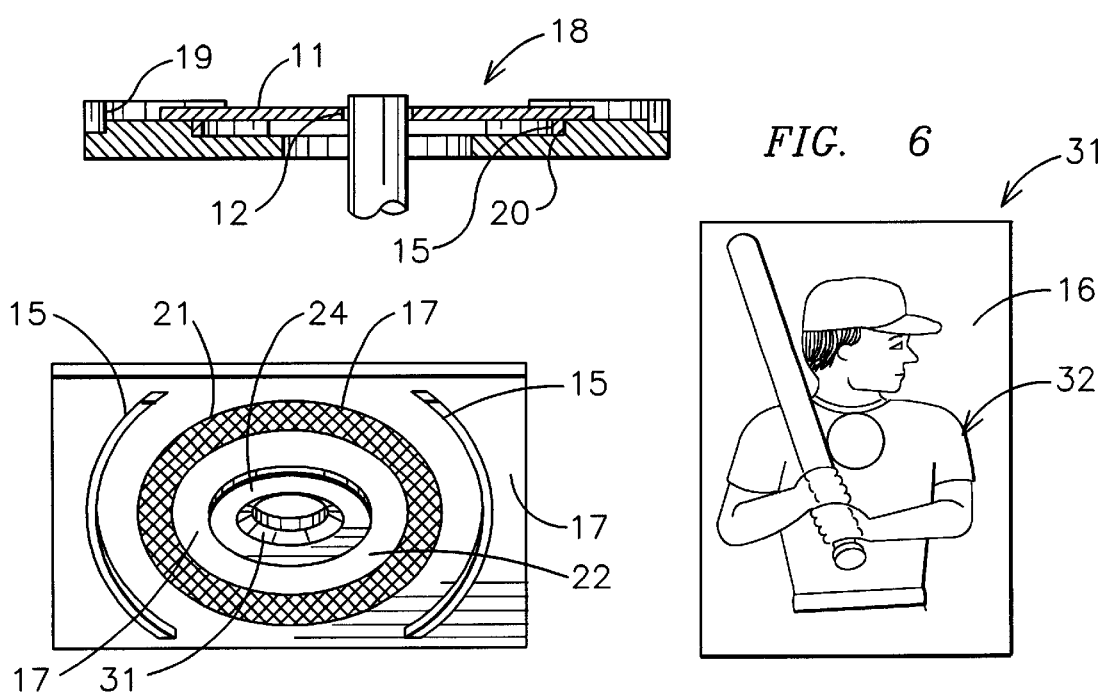
FIG. 7
FIG. 8

COMPACT DISC WITH A DISC TRAY ALIGNMENT MEANS

This Application is a continuation-in-part of U.S. patent application Ser. No. 08/856,915, filed May 5, 1997 which has issued as U.S. Pat. No. 5,982,736, for which Applicant claims priority.

FIELD OF THE INVENTION

The present invention relates to compact discs. More specifically, this invention pertains to compacts discs having been modified to replicate trading cards that are undersized with respect to standard compact discs.

BACKGROUND OF THE INVENTION

Compact discs (also referred to herein as "CD") contain an optically readable data storage medium between two molded plastic layers that may contain a CD-compatible video and/or audio and/or alphabetic message. Compact discs or CDS as they are commonly referred to have the capability of storing some 600 megabytes of digitized audio or video material in a computer or player format, also known as CD-ROM.

Conventional compact discs are fabricated as standard-size rigid plastic discs through an injection mold manufacturing process. Each CD contains a series of either circular or spiral data tracks that are illuminated and read by an optical reader which is usually a laser. The data tracks are protected by two layers of transparent but rigid plastic that are sealed during manufacturing to prevent contamination, flaking and/or warping.

A CD nests within a circular depression in a compact disc tray. The depression forms an outer rim which aligns the CD within the tray. When the disc tray is pushed into a player or computer, a spindle extends through a spindle hole on the CD. The CD rotates on a spindle and the rim aligns and supports the CD within the tray as it rotates within the tray. Some CD trays include two depressions forming an outer rim for conventional CDS and an inner rim for a mini-CD. If a CD is made that is not large enough to engage the outer rim, or too large to engage the inner rim, the CD will not properly align with the spindle, or will not rotate efficiently within the tray.

SUMMARY OF THE INVENTION

In view of the foregoing, it is an object of this invention to provide a compact disc in the format of a trading card. Another object of this invention is to adapt a compact disc having a nonconventional size so it is compatible with compact disc trays.

Utilizing traditional and presently acceptable CD manufacturing processes, the present invention provides a means whereby collectible trading cards can be made to "talk" through the use of an optically readable data storage medium between two molded plastic layers resembling a traditional trading card format.

The data surface is positioned within a playback zone that includes surface elements which encode digital data and permit the reception of electrical signals by standard CD or CD-ROM player optical readout mechanisms. The compact disc contains digital data that permits it to playback video, audio and/or alphabetic information or varying lengths.

A centrally located spindle hole is geometrically compatible with a standard CD or CD-ROM player spindle to enable the CD to be supported and rotated by a stationary spindle. The optically readable data storage area can then be read by a standard CD or CD-ROM player optical readout device.

Two ridges on the bottom surface of the CD enable the disc to be centered in non-stationary spindled CD or CD-ROM players (non-spindled tray holder players). The ridges align the card so that a non-stationary spindled player tray can host the card in a manner which permits a standard CD or CD-ROM player optical readout device to read the data as required.

In a second embodiment the compact disc does not include the ridges, but an alignment disc is used with compact disc. The alignment disc is a standard compact disc having a depression for receiving the trading card CD.

In the case of trading cards, the compact disc contains information relating to items, persons or events depicted on the card. Compact discs may be reduced in size to replicate a trading card. That is the CD is shaped as a trading card. Unlike a 3.5 inch or 3 inch traditional round CD, a trading card CD is rectangular and resembles a traditional 3.5 inch by 2.5 inch trading card.

BRIEF DESCRIPTION OF THE DRAWINGS

FIG. 4 is a top plan view of the invention within a disc tray.

FIG. 5 is a sectional view of the invention within a disc tray.

FIG. 6 is a sectional view of the invention within a disc tray and a spindle.

FIG. 7 is a bottom perspective view of the invention with a docking collar.

FIG. 8 is the invention with an image embossed on the top surface.

DETAILED DESCRIPTION OF THE DRAWINGS

Figure 1:
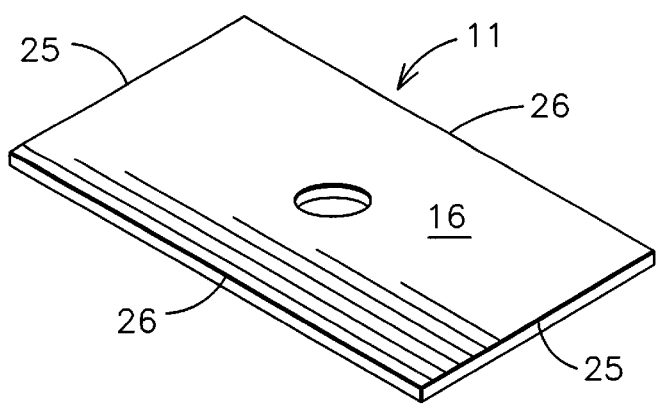
FIG. 1 is a top perspective view of the invention.

The present invention is depicted in FIGS. 1 through 9 and includes a compact disc 11 (also referred to as "CD") that has been reduced in size to replicate a trading card. With respect to FIGS. 1 and 2, the compact disc 11 includes a planar body having a top surface 16 and a bottom surface 17. In the embodiment depicted herein the planar body has a rectangular shape including two end edges 25 and two side edges 26.

A spindle hole 12 is centrally aligned on the CD 11. This centrally located hole 12 supports the compact disc 11 on a spindle enabling it to rotate for optical reading by standard CD or CD-ROM player optical readout devices. The compact disc is made of a plastic or any other hard, durable transparent material, manufactured through an injection molding process. The placement and manufacture of the optically readable data is performed by utilizing traditional CD manufacturing processes.

Figure 2:
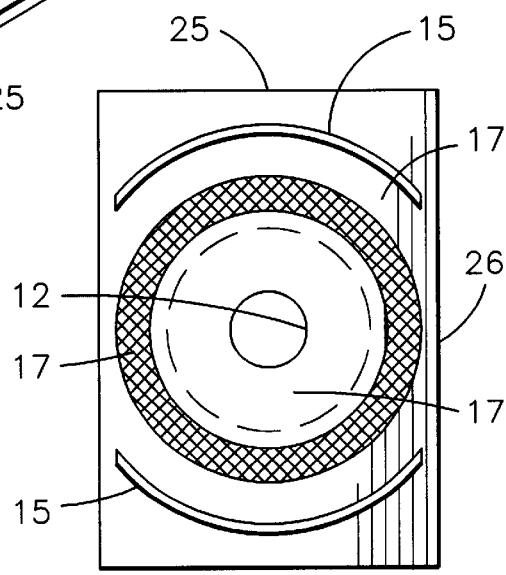
FIG. 2 is a bottom plan view of the invention.
Figure 3:
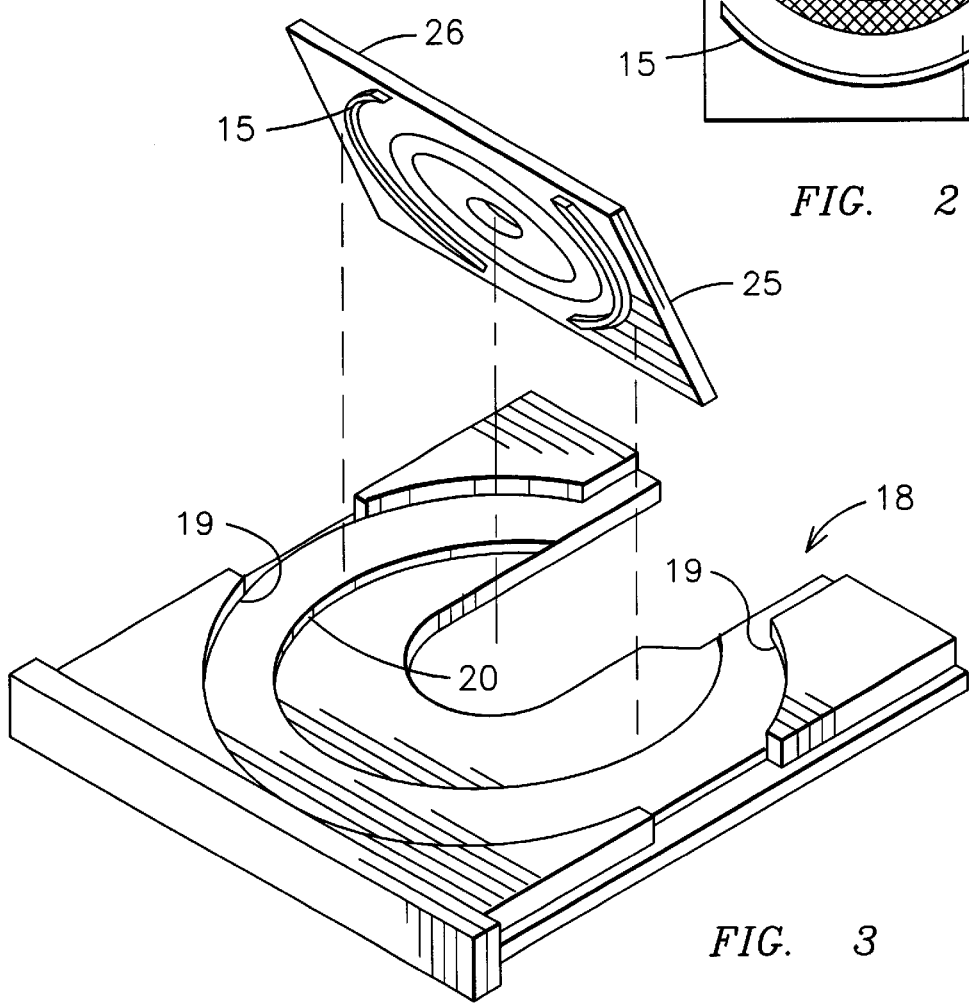
FIG. 3 is an expanded perspective view of the invention being placed in a disc tray.

With respect to FIGS. 2 and 3, in as much as the compact disc is not large enough to properly nest within the disc tray 18, the CD 11 includes a means for aligning the disc 11 within the tray 18. Two ridges 15 are mounted to the bottom surface 17 of the compact disc 11. The two ridges 15 facilitate alignment of the compact disc 11 within a CD tray 18.

In FIGS. 3 through 6, the CD is shown being placed, and nesting, within a CD tray 18. A standard CD tray includes an outer rim 19 and an inner rim 20. The outer rim 19 aligns a standard CD within the tray 18. The inner rim 20 is usually for the alignment of mini-compact discs.

The compact disc 11 is not as large as a standard CD, and is not capable of engaging the outer rim 19 of the CD tray 18. The ridges 15 are positioned on the compact disc 11 for alignment with the inner rim 20 of the tray 18. As shown in FIG. 3, the ridges 15 have an arcuate shape concentric with the inner rim 20 of the tray 18. The ridges 15 are spaced sufficiently from the spindle hole 11 for alignment with the inner rim 20.

The optically readable data is located on the bottom surface 17 of the compact disc 11, as depicted in FIG. 2. Since the surface of the card itself is made of transparent material, a standard CD or CD-ROM player optical readout device is capable of reading the video/audio/alphabetic programs contained on the compact disc. The width of the CD 11 presently enables an outer band 21 of optical data to extend radially outward from the center approximately 1.125 inches. An inner band 22 extends radially from the spindle hole 0.875 inches, which utilizing present technology, permits the placement of approximately 60 megabytes of data onto the card's surface. A compact disc 11 in the shape of a trading card is about 3.5 inches long and 2.5 inches wide.

The compact disc 11 is shown in a disc tray 18 in FIG. 6 with a spindle 23 extending through the spindle hole 12. Some trays have a spindle that extends upward from the tray 18. With respect to FIGS. 7 and 8, the CD 11 may also have a docking collar 24 mounted on the bottom surface of the CD 11 between the spindle hole 12 and the ridges 15. When the CD is placed in a disc tray 18 and the tray is activated a spindle rises and extends through the spindle hole 12. The collar 24 aligns the spindle 23 with the spindle hole 12 when the spindle 23 is activated. In addition the collar 24 supports the planar body of the CD to prevent warping of the disc 11. The collar 24 has a surface 25 inclined toward the spindle hole 12 forming a conical shape to the docking collar 24.

The compact disc 11 may be constructed in a variety of shapes. The CD 11 depicted herein has a rectangular shape similar to trading cards. As shown in FIG. 8, the CD trading card 31 has an image 32 embossed thereon and data pertaining to the image 32 is stored on the CD trading card 31. Audio and/or video information relating to the image 32 on the CD trading card 31 relayed and displayed.

Figure 9:
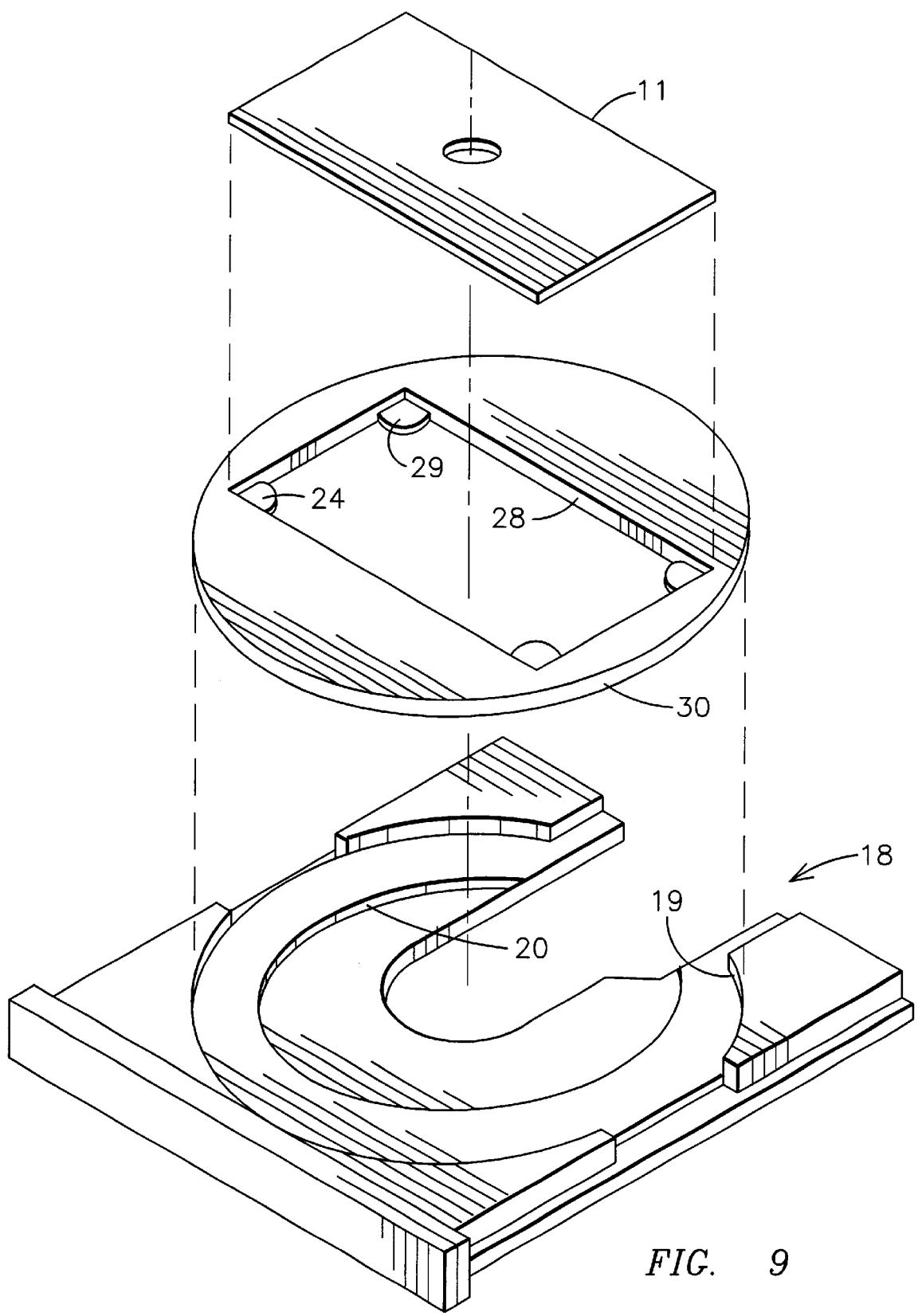
FIG. 9 is a expanded perspective view of a second embodiment of the invention

With respect to FIG. 9, a second embodiment of the disc tray alignment means is illustrated. The compact disc 11 is in the shape of a trading card. The CD trading card 11 is aligned within the disc tray 18 by an alignment disc 27. The alignment disc 27 includes a standard compact disc having a depression 28 is centrally located on the alignment disc 27.

The depression 28 extends through the alignment disc 27 and a tab 29 extends diagonally across each corner of the depression 27 to support the CD trading card 11 on the alignment disc 27. When the alignment disc 11 is placed in the disc tray 18, the edge 30 of the alignment disc 11 is aligned with the outer rim 19 of the disc tray 11. The CD trading card 11 is placed within the alignment disc 27 and is ready to be played.

While I have disclosed the preferred embodiment of our invention, it is not intended that this description in any way limits the invention, but rather this invention should be limited only by a reasonable interpretation of the new recited claims.

Having thus described my invention, what We claim as new and desire to secure by Letters Patent is:

1. A compact disc for use in a disc tray having an outer circular rim for alignment of a standard sized compact disc and an inner circular rim for alignment of a mini compact disc, the compact disc comprising:

a rectangular disc body having a top surface, a planar bottom surface and edges sized to extend intermediate the outer circular rim and the inner circular rim of a disc tray;

a spindle hole formed through the disc body and centrally aligned on the disc body;

two arcuate shaped ridges disposed on the planar bottom surface of the disc body, the ridges disposed on opposed sides of and concentric with the spindle hole, the ridges spaced from the spindle hole for alignment with the inner circular rim.

2. The compact disc of claim 1, further comprising a collar attached to the bottom surface of the disc body adjacent the spindle hole and extending around the spindle hole.

3. The compact disc of claim 1, further comprising;

an alignment disc having an edge sized to align with the outer circular rim of a disc tray;

a rectangular depression formed through the alignment disc and adapted for receiving the rectangular disc body;

a tab extending diagonally across each corner of the depression for supporting the rectangular disc body within the alignment disc.

4. The compact disc of claim 1, further comprising:

an image formed on the top surface of the disc body; and a band of data formed in the disc body between the spindle hole and the two ridges, the band of data being optically readable from the bottom surface; the band of data pertaining to the image.

5. The compact disc of claim 4, wherein the disc body comprises the shape of a trading card about 3.5 inches long and 2.5 inches wide.

6. A compact disc trading card comprising:

a disc body having a planar top surface, a planar bottom surface and rectangular shaped edges;

a spindle hole formed through the disc body and centrally aligned on the disc body;

two arcuate shaped ridges disposed on the planar bottom surface of the disc body, the ridges disposed on opposed sides of and concentric with the spindle hole, for alignment with an inner circular rim of a disc player an image disposed on the planar top surface;

optically readable data formed in the disc body between the two ridges, the optical data pertaining to the image.

7. The compact disc trading card of claim 6, further comprising:

an alignment disc having a circular edge;

a rectangular depression formed through the alignment disc and adapted for receiving the disc body; and a tab extending diagonally across each corner of the depression for supporting the disc body within the alignment disc.

8. A compact disc for use in a disc tray having an outer circular rim for alignment of a standard sized compact disc and an inner circular rim for alignment of miniature disc said compact disc, comprising:

a rectangular disc body having a top surface, a planar bottom surface and edges sized to extend intermediate the outer circular rim and the inner circular rim of a disc tray;

a spindle hole formed through the disc body and centrally aligned on the disc body;

two arcuate shaped ridges disposed on the planar bottom surface, the ridges disposed on opposed sides of and concentric with the spindle hole, the ridges spaced from the spindle hole for alignment with the inner circular rim, each said ridge having an inner edge defining an inner diameter within which a band of data is formed in the disc body between the spindle hole and the inner edge of each ridge, the band of data being optically readable from the bottom surface, and each said ridge having an outer edge defining an outer diameter thereof; and, An image on a top surface of the disc body, and the band of data pertaining to the image.

9. The compact disc of claim 8 further comprising the shape of a rectangular trading card having dimensions of about 3.5 inches long and 2.5 inches wide.

10. The compact disc of claim 8 further comprising a collar on the bottom surface of the disc body adjacent the spindle hole and extending around the spindle hole.

* * * * *